Jan. 16, 1934.         E. A. BAILEY                1,943,362
              LIQUID FEED PROPORTIONING DEVICE
                     Filed Sept. 8, 1930
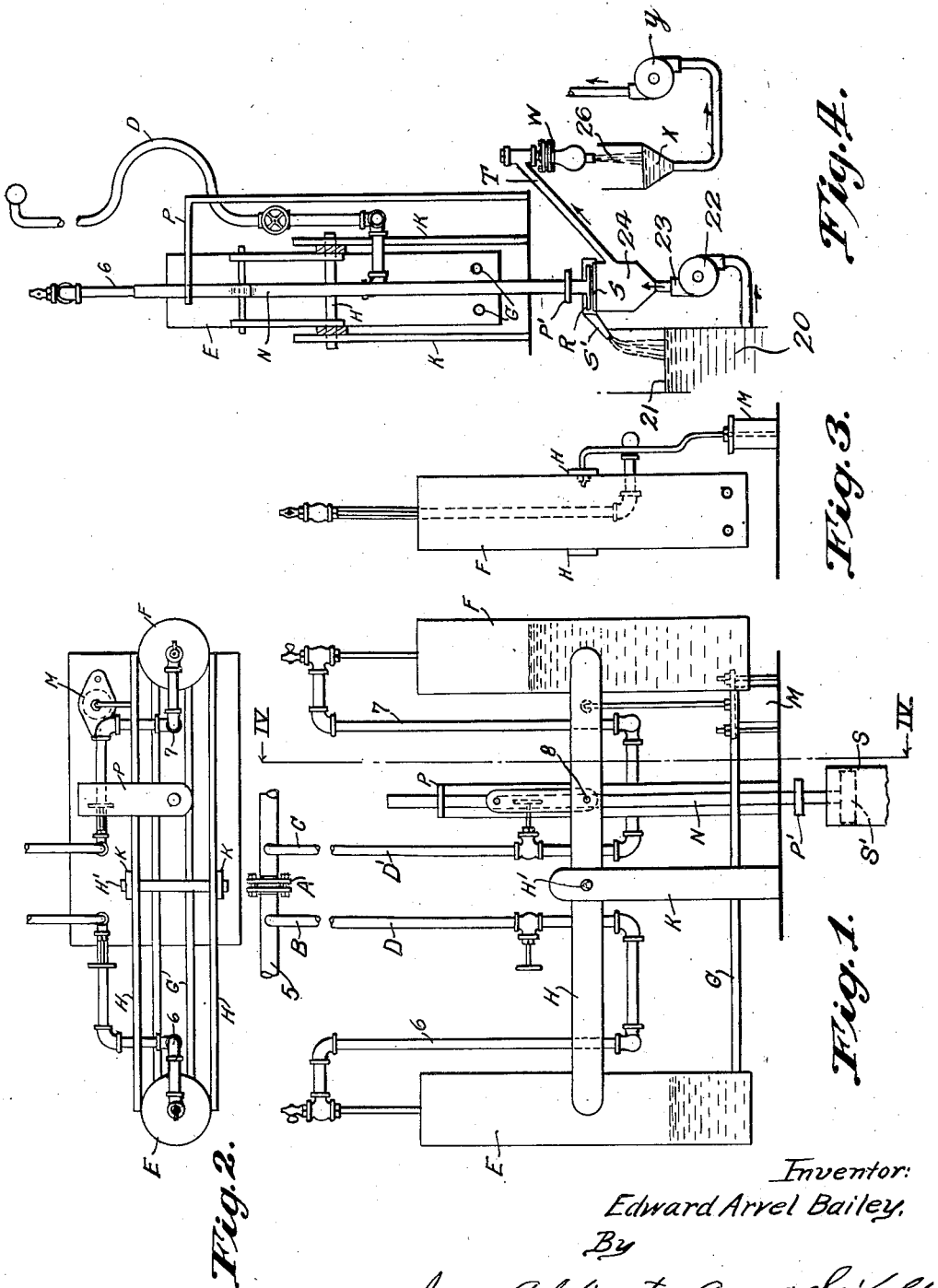
Inventor:
Edward Arvel Bailey,
By
Jones, Addington, Ames & Seibold
Attorneys.

Patented Jan. 16, 1934

1,943,362

UNITED STATES PATENT OFFICE 1,943,362

LIQUID-FEED PROPORTIONING-DEVICE

Edward Arvel Bailey, Neodesha, Kans., assignor to The Standard Oil Company, Neodesha, Kans., a corporation of Kansas Application September 8, 1930. Serial No. 480,348

6 Claims. (Cl. 210—31)

The present invention relates to an improved device for accurately proportioning an amount of liquid, such as a chemical reagent, which is emitted from an orifice against atmospheric pressure, the amount of emission being controlled by the flow existing in a pipe line through which the liquid to be treated is passed.

One of the objects of the invention is to provide an apparatus that regulates the amount of fluid fed into another kind of fluid while passing through a pipe, in the same proportion one to the other, regardless of variation in rate of flow of the fluid to be treated.

Another object of the invention is to provide an apparatus in which the differential pressure between two interconnected columns of mercury is physically applied to a control valve so as to apply a pre-determined pressure upon the liquid that is to be forced from an orifice against atmospheric pressure.

Another object of the invention is to employ the difference in pressure, existing on opposite sides of a pipe line interrupted by means of a restriction or orifice to displace a volume of mercury from one column, thereby transferring said mercury into a second column connected therewith, both columns being physically balanced about a centrally located fulcrum, whereby an upsetting moment is given to the balance thus constituted, said moment being applied, by suitable means, to the valve-stem of a proportioning valve that is placed in the path of a constantly circulating supply of a liquid reagent.

Other objects of the invention will appear in connection with the hereunto appended drawing and the description thereof hereinbelow.

The device consists essentially of an orifice-plate or Venturi tube, or other means of restriction in the line of flow of the fluid to be treated, while the same is passing through a pipe line or the like.

It is obvious that there will be greater pressure existing on the upstream side of said orifice than there will be on the downstream side thereof.

By providing means for diverting a portion of the liquid passing through the pipe from both the upstream and downstream pipes of said pipe line, and in close proximity to said restriction, two sources of fluid under pressure will be obtained. These sources of fluid under pressure are then hydrostatically applied through a flexible pipe line to the tops of two bodies of mercury which are in physical communication through another pipe line; whereby mercury will be transferred from one body to the other body in proportion to the pressure exerted on the surface of the mercury by the said fluids.

The containers housing the mercury and their connections are substantially of equal weight, the said housings being attached to a balance having a fulcrum intermediate said housings, thereby constituting a set of scales. It will be obvious that as mercury is transferred from one housing to the other that the equilibrium of said scale will be upset and that under the influence of gravity the side containing the greater weight of mercury will go down while the other side will go up. The downward moment thus exerted by the heavier side of the scale is then transferred, by suitable mechanical means, to a proportioner-valve whereby in turn the pressure of another, constantly circulating, system of liquid is varied.

The liquid in said second system circulates in a closed circuit, but means are provided to discharge a portion of said liquid from said circuit through an orifice that is open to the air.

According to well-known hydrostatic laws, the amount of liquid discharged under pressure through an orifice of a given size is directly proportional to the pressure exerted by said liquid; hence if the pressure on said liquid is increased, more of the fluid will be ejected from the orifice, and vice-versa.

The essence of the invention therefore lies in providing two balanced bodies of mercury, means for upsetting the balance thereof, and means for exerting the differential moment thus produced upon a second body of liquid, thereby varying the pressure of the latter, so as to cause emission of greater or lesser amount of said second liquid against atmospheric pressure, and transferring the thus emitted liquid to the first liquid i. e. the one that is to be treated with the reagents contained in the second liquid.

In order to provide a better understanding of the present invention, and to furnish a basis for the detailed description immediately to follow, reference is directed to the drawing, in which, Figure 1 is a front elevation of the device substantially in diagrammatic form;

Fig. 2 is a top plan view thereof;

Fig. 3 is a side elevation; and

Fig. 4 is a section along line 4—4 of Fig. 1, and a diagrammatic illustration of the manner in which the liquid that is to be controlled is circulating.

Referring to the figures, the fluid that is to be treated with the chemical is continuously passed through the pipe 5, its flow being restricted by passing through the orifice-plate A. The pipe 5 is tapped at both sides of the orifice plates A by means of pipes B and C; both of these pipes having flexible portions D and D'. The pipe B is connected by means of the pipe 6 with a mercury container E; while the pipe C is connected with a similar mercury container F through the pipe 7. The two mercury containers are interconnected near the bottoms thereof by the duct G.

The two mercury chambers E and F are mechanically supported in a vertical position by means of the balance beam H which is supported at the pivot H'; which latter preferably is in the form of a knife-edge held by the upright support K. Intermediate between the connection of the beam H with the mercury chamber F and the fulcrum H' there is a pivotal connection 8 to a valve stem N, the said stem being guided by guides P and P' respectively. The said valve stem N is directly connected to the valve disc R of the proportioner-valve S, which is provided with the overflow spout S'.

Referring to Fig. 4, there is therein illustrated, purely diagrammatically, a storage tank 20, containing a supply 21 of the reagent that is to be mixed with the fluid passing through the pipe 5. From this tank 20 fluid is lifted by means of the pump 22 and forced in the direction of the arrows through pipe 23 into the valve chamber 24 and from the same through the pipe T to the discharge orifice W, from which it is emitted flowing into the receiver X, whence it is pumped by the pump Y to the main flow line. The chamber 24 is provided at its top with a valve-seat S and a valve R, which allows liquid to pass to spout S', and thereby back to the storage tank 20. It will be obvious that the more nearly the valve R rests on its valve-seat S, the greater will be the hydrostatic pressure in the chamber 24 and the pipe T, whereby the greater pressure will result in the discharge of larger quantities of liquid from the orifice W.

Assuming that the pump 22 is running at constant speed there will obviously be a corresponding pressure existing in the chamber 24 and the pipe T; by reason of which pressure a stream or jet of liquid 26 will be emitted from the orifice W. In proportion to the opening or closing of the proportioner-valve constituting the parts R and S, the pressure in the chamber 24 and the pipe T will be raised or lowered and in consequence thereof the amount of fluid discharged through the orifice W will be proportionally increased or decreased. Now inasmuch as the proportioner-valve is opened or closed in proportion to the difference in weight of the two sides of the balanced beam H, more or less liquid will be discharged through the orifice W, and the control of the feed of the reagent 21 is thereby effected.

The theory underlying the functioning of this apparatus is substantially as follows:

Fluid passing a restriction such as an orifice plate, Venturi tube or other obstruction placed in a pipe line must have enough additional pressure upstream to off-set the effect of the restriction, and this difference in pressure varies with a very definite relationship to the various quantities passing through such restriction. Thus by placing an obstruction in the main flow line, such an orifice plate, Venturi tube or etc. and communicating the difference in pressure between upstream and down-stream side of said obstruction to the upstream side of a similar obstruction in a line discharging against atmospheric pressure— we have two similar conditions whereby the latter will discharge a quantity of the same proportion to the quantity flowing in the first line regardless of variations in the rate of flow thereof.

This apparatus produces the above results in the following manner: (It is assumed in describing the function of the apparatus that the following conditions exist): That a fluid is flowing past a restriction in main flow line causing a difference in pressure above and below said restriction. That the chemical solution to be used is being circulated from a tank to a pump and returned to the tank at a nearly constant rate of flow. That another pump is provided for receiving the amount of chemical solution to be fed into the fluid as treatment and discharge it into main flow line. The two mercury cylinders (E) and (F) are supported in an upright position one on each end of balance beam (H) and connected together at the bottom with a duct (G); a duct (B) having a flexible section (D) connects the upstream side of restriction in main flow line with mercury chamber (E) another similar duct connecting the main flow line from the other side of restriction with mercury chamber (F). A greater pressure existing in the upper part of mercury chamber (E) than in mercury chamber (F) causes the mercury to flow from chamber (E) to chamber (F) sufficiently to offset this difference in pressure which results in a greater weight being contained in chamber (F) than chamber (E). A predetermined ratio, depending on the size of disc in proportioner valve, of this difference in weight of mercury contained in the chambers is exerted on proportioner valve stem (N), which results in the same amount of pressure per square inch being maintained on the discharge line from the chemical solution circulating-pump as exists as difference in pressure above and below the restriction in the main flow line. Thus with duct (T) leading off of this line to chemical feed orifice (W) which discharges against atmospheric pressure—we have a condition wherein the volume of liquid passing the chemical feed orifice is automatically maintained at the same proportion to the volume passing the restriction in the main flow line.

Cylinders E and F both have the same dimensions and are suspended on an axis at such a point that the center line of gravity holds them in an upright position either when they are empty or both equally filled with mercury. They may be made in various sizes both in diameter and height for the following reasons: Assuming that the apparatus was designed to regulate up to a pressure of 20 lbs. per sq. in. above atmosphere on the regulating valve seat of 4" diameter, it would be necessary to have a pair of cylinders long enough that 20 lbs. additional pressure might exist above the mercury in cylinder E without depressing the mercury in that cylinder to a point where the fluid above the mercury could pass from cylinder E to cylinder F and the cylinders should be large enough in diameter for the additional weight of mercury transferred into cylinder F. Due to the 20 lbs. excess pressure existing in cylinder E to operate as a working pressure of 20 lbs. per square in. on the 4" valve seat. An apparatus designed to operate against a maximum differential of 5" gauge pressure and a 4" regulating valve seat would require the same size in diameter of the mercury chambers but the length of the cylinders would be 75% less and vice-versa if there were maintained pressure on a 2" valve seat instead of a 4" the diameter of the cylinder should be reduced 50%. The apparatus is however not to be limited to any specific dimensions.

The apparatus is particularly suitable for feeding chemicals into boiler-feed water to soften the same, or into natural water supplies for the purpose of coagulation or otherwise.

The apparatus has been found in actual practice to be extremely sensitive and accurate, and because mercury is very heavy and yet mobile, the control of the proportioner-valve is very accurate and substantially without lag.

The flexible connections D are preferably made of rubber while the apparatus itself is preferably made of iron or other metals not wetted by mercury.

Obvious mechanical equivalents and expedients are to be construed as within the scope of the present invention for which the following claims are made.

I claim:

1. Apparatus for proportioning feed of fluid reagent which comprises means for circulating said reagent from and to a supply tank, means for throttling said flow, an orifice for discharging said reagent into the atmosphere, an orifice whereby a stream of liquid to be treated is divided into an up-stream and downstream portion, two mercury chambers connected respectively with said up-stream and down-stream portions and also with each other near the bottoms thereof, means for supporting said mercury chambers balanced on a beam about a central fulcrum, and means connecting one arm of said beam with the means for throttling the flow of the reagent.

2. Apparatus for proportioning the feed of a fluid reagent which comprises two interconnected mercury chambers, means for applying differentials of pressure thereto whereby mercury is forced from one chamber into the other, a balance beam on which said mercury chambers are mounted, means for supporting said beam, means for circulating the reagent to and from a supply tank through a pipe having an orifice open to the atmosphere, means for throttling the circulation of said reagent, and connection between one arm of said balance beam and said throttling means.

3. Apparatus for proportioning the feed of a fluid reagent into a liquid to be treated therewith, which comprises, in combination, an orifice whereby the liquid to be treated is divided into a zone of higher and of lower pressure, two mercury-chambers mounted in balanced relationship upon a balance beam, connections between the zone of higher pressure and one mercury-chamber and between the zone of lower pressure and the other mercury-chamber, connection between said mercury-chambers whereby mercury may flow from one to the other; a supply tank for said reagent means for circulating the fluid reagent from and to said supply tank, means for regulating the pressure in said circulating means, means connecting said balance beam on the side of the mercury-chamber that is connected with the low-pressure zone with said regulating means, an orifice in the circulating system of said fluid reagent whereby the latter is discharged against atmospheric pressure, and means for conveying the reagent thus discharged to the liquid to be treated.

4. Apparatus for proportioning the feed of a fluid reagent into a stream of fluid material that is to be treated therewith, which comprises, in combination, a supply-tank for said reagent, means for withdrawing said reagent therefrom and to force it into a pressure-chamber, means associated with the latter to regulate the outflow therefrom comprising a valve, a permanently adjusted orifice permitting escape of fluid from said pressure-chamber, and means for actuating said valve controlled by the flow of said stream of fluid material, said latter means comprising balanced interconnected chambers containing mercury said chambers being in communication with said stream of fluid material.

5. Apparatus for proportioning the flow of a fluid reagent into a stream of liquid to be treated therewith which comprises a supply-tank for said reagent, a pressure-chamber and a valve controlling the outflow of the latter, means for forcing reagent into said chamber whereby hydrostatic pressure is produced therein, an orifice associated with said chamber to permit egress of fluid in proportion to the pressure existing in said chamber, and means controlled by the flow of said stream of liquid to actuate said valve whereby the hydrostatic pressure in said chamber is varied, said latter means comprising balanced interconnected chambers containing mercury, said chambers being in communication with said stream of fluid material.

6. Apparatus for automatically proportioning the flow of a reagent into a main mass of fluid at least part of which fluid traverses a duct which comprises the combination of a supply-tank for said reagent, a pump, a discharge pressure-chamber connected with the outlet side of said pump, means for applying a variable pressure on the reagent in said chamber comprising an outflow valve therefor, means comprising two interconnected mercury-containing chambers connected with said duct for actuating said valve said latter means being responsive to the pressure changes in the fluid traversing said duct, and a fixed orifice permitting egress of reagent from said pressure-chamber.

EDWARD ARVEL BAILEY.